(12) United States Patent
Graham

(10) Patent No.: US 6,858,190 B2
(45) Date of Patent: Feb. 22, 2005

(54) HEAVY WATER PRODUCTION PROCESS AND APPARATUS

(75) Inventor: William R. C. Graham, Deep River (CA)

(73) Assignee: Atomic Energy of Canada Limited, Ontario (CA)

( * ) Notice: Subject to any disclaimer, the term of this patent is extended or adjusted under 35 U.S.C. 154(b) by 764 days.

(21) Appl. No.: 09/774,046

(22) Filed: Jan. 31, 2001

(65) Prior Publication Data

US 2002/0141916 A1 Oct. 3, 2002

(51) Int. Cl.⁷ .............................. C01B 5/02; B01D 59/32
(52) U.S. Cl. ..................... 422/190; 422/188; 422/189
(58) Field of Search .............................. 422/190, 188, 422/189; 423/647.7, 580.1, 580.2

(56) References Cited

U.S. PATENT DOCUMENTS

| | | | |
|---|---|---|---|
| 2,908,554 A | | 10/1959 | Hoogschagen |
| 2,927,003 A | | 3/1960 | Becker |
| 3,807,960 A | * | 4/1974 | Thayer ........................ 422/159 |
| 3,888,974 A | | 6/1975 | Stevens |
| 3,974,048 A | | 8/1976 | Hammerli et al. |
| 3,981,976 A | | 9/1976 | Stevens |
| 3,983,226 A | * | 9/1976 | Nazzer et al. ........... 423/580.2 |
| 4,123,508 A | | 10/1978 | Mandrin |
| 4,225,402 A | | 9/1980 | LeRoy et al. |
| 4,414,195 A | | 11/1983 | Mandrin |
| 4,426,370 A | | 1/1984 | Mandrin |

OTHER PUBLICATIONS

A.I. Miller and H.M. van Alstyne: "Heavy Water: A Distinctive and Essential Component of CANDU". Presented at the International Atomic Endergy Agency Technical Committee Meeting, Toronto, Ontario, 1993 Jun. 7–10, 1994.
International Isotope So., Canadian Chapter Meeting, May 14–14, 1998, XP–002203641.
Core Issues, the Journal of the Uranium Institute, 2000 Issue 2, Dec. 2000, "A closer look at heavy water".
International Search Report.

* cited by examiner

Primary Examiner—Kiley S. Stoner
Assistant Examiner—Len Tran
(74) Attorney, Agent, or Firm—Sughrue Mion, PLLC

(57) ABSTRACT

A hybrid BHW-CIRCE process heavy water production system in which most or all of the CECE upper stages of the CIRCE process are replaced with BHW liquid phase catalytic exchange stages. The system allows the CIRCE process to return to a more natural cascade resulting in a more cost effective process.

6 Claims, 7 Drawing Sheets

HEAVY WATER PRODUCTION PROCESS AND APPARATUS

FIELD OF THE INVENTION

This invention relates to a method and apparatus for producing deuterium enriched water in a countercurrent separation process.

BACKGROUND OF THE INVENTION

Most of the world's heavy water supplies are currently provided by the Girdler-Sulphide process or processes based on ammonia-hydrogen catalytic exchange. The Girdler-Sulphide process is a bithermal (two temperature) heavy water production process and takes advantage of differences in thermodynamic separation factors between water and hydrogen sulphide. The process uses a cascaded series of dual-temperature, mass transfer columns circulating large quantities of hydrogen sulphide gas countercurrently to natural water feed. Both the Girdler-Sulphide process and ammonia-hydrogen catalytic exchange require large capital expenditures. The ammonia process has size limitations and the Girdler-Sulphide process consumes large amounts of energy and utilizes very hazardous hydrogen sulphide.

The exceptional properties of heavy water as a neutron moderator make it useful in nuclear reactors and in particular the CANDU nuclear reactor developed by Atomic Energy of Canada Limited. However, the high cost of heavy water produced using the Girdler-Sulphide process and ammonia-based processes can affect the economic attractiveness of heavy-water moderated reactors such as CANDU. Accordingly, a number of other processes have been proposed for heavy water production. Among them are processes that exploit deuterium isotope exchange between water and hydrogen using a catalyst.

One such process is known as Combined Electrolysis and Catalytic Exchange ("CECE"). The CECE process has previously been described in U.S. Pat. No. 3,974,048. It is a monothermal process with the conversion of water into hydrogen achieved by electrolysis. Because the entire feed stream must be electrolysed, the cost of electrolysis can result in a prohibitively expensive process for heavy water extraction and is practical only as a parasitic process where large scale electrolysis is performed for other reasons.

A second parasitic process is Combined Industrially Reformed hydrogen and Catalytic Exchange ("CIRCE"). CIRCE uses an industrial monothermal steam reformer for the first stage to generate hydrogen from methane and water feeds and electrolysis (typically CECE) for higher stages. Although it is more complex than the CECE process, the main attraction of the CIRCE process is the widespread availability of relatively large plants producing hydrogen by steam reforming. The CIRCE process suffers from the fact that elevated levels of deuterium in the reformer mean that leaks of any deuterated species (water, methane, hydrogen) from the reformer are particularly costly and the plant requires a high level of leak tightness in the reformer. Optimization of the CIRCE process for the lowest unit cost is primarily a balance between minimizing first stage catalyst volume and loss of deuterium with reformer leakage (by moving separative work into the higher stages) and minimizing electrolytic cell capital costs (by moving separative work into the first stage). However, as electrolytic cell capital costs dominate, the lowest unit cost solution is a distorted cascade with a first-stage enrichment five to seven times greater than in an ideal cascade, resulting in a configuration having high reformer losses and a comparatively low production. Indeed, the economics of the CIRCE process depend substantially on the cost of modifications required to make the industrial reformer relatively leak tight and on the amount of deuterium lost through the reformer. In addition, the CECE upper stages of the CIRCE process must receive a liquid (i.e. water) feed from the first stage.

An alternative process to harness water-hydrogen exchange is the Bithermal Hydrogen Water (BHW) process. BHW is a non-parasitic process using liquid phase catalytic exchange. In each stage there is an upper cold tower where the deuterium transfers from the hydrogen to the liquid water, and a lower hot tower where the deuterium transfers from the water to the hydrogen gas. The feed to the higher stages is taken from between the cold and hot towers. The BHW process is similar to the Girdler-Sulphide process, but with the advantages of much superior separation factors, lower energy consumption and non-toxic and non-corrosive process fluids.

SUMMARY OF THE INVENTION

In the present invention, it has been found that most or all of the CECE upper stages of the CIRCE process can be advantageously replaced by BHW liquid phase catalytic exchange stages. The replacement of CECE stages with BHW stages allows the CIRCE process to return to a more natural cascade resulting in a more cost effective process.

Thus, in accordance with the present invention, there is provided, a liquid connected hybrid BHW-CIRCE heavy water production system having a series of cascaded stages, the first stage comprising a first stage catalytic exchange column for passing liquid water in deuterium exchange relation with hydrogen gas to produce a deuterium enriched first stage liquid water stream and an industrial steam reformer for evolving a hydrogen gas product stream from liquid water, a portion of said deuterium enriched first stage liquid water stream from said first stage catalytic exchange column being applied as feed to said reformer and said reformer hydrogen gas product stream being applied as feed to said first stage catalytic exchange column, a Bithermal Hydrogen Water ("BHW") second stage comprising cold and hot second stage catalytic exchange columns for passing liquid water in deuterium exchange relation with hydrogen gas, said cold second stage catalytic exchange column operating at a lower temperature effective to cause transfer of deuterium from hydrogen gas to liquid water, said second stage hot catalytic exchange column operating at a higher temperature effective to cause transfer of deuterium from liquid water to hydrogen gas, means for circulating said hydrogen gas in a stream through said second stage cold and hot catalytic exchange columns, means for applying a portion of said deuterium enriched first stage liquid water stream from said first stage catalytic exchange column to said second stage cold catalytic exchange column in countercurrent relation to said hydrogen gas stream to produce a deuterium enriched second stage liquid water stream, means for applying a portion of said second stage liquid water to said second stage hot catalytic exchange column in countercurrent relation to said hydrogen gas stream to produce a deuterium depleted second stage liquid water stream, means for applying said deuterium depleted second stage liquid water stream to said reformer, means for removing a portion of said deuterium enriched second stage liquid water stream produced by said second stage cold catalytic exchange column from said second stage.

In accordance with another aspect of the present invention, there is provided a gas-connected hybrid BHW- CIRCE heavy water production system having a series of cascaded stages, the first stage comprising a first stage catalytic exchange column for passing liquid water in deuterium exchange relation with hydrogen gas to produce a deuterium enriched first stage liquid water stream and an industrial steam reformer for evolving a hydrogen gas product stream from liquid water, said deuterium enriched first stage liquid water stream from said first stage catalytic exchange column being applied as feed to said reformer and a portion of said reformer hydrogen gas product stream being applied as feed to said first stage catalytic exchange column, a Bithermal Hydrogen Water ("BHW") second stage comprising cold and hot second stage catalytic exchange columns for passing liquid water in deuterium exchange relation with hydrogen gas, said cold second stage catalytic exchange column operating at a lower temperature effective to cause transfer of deuterium from hydrogen gas to liquid water, said second stage hot catalytic exchange column operating at a higher temperature effective to cause transfer of deuterium from liquid water to hydrogen gas, means for circulating said liquid water in a stream through said second stage cold and hot catalytic exchange columns, means for applying a portion of said reformer hydrogen gas product stream to said second stage hot catalytic exchange column in countercurrent relation to said liquid water stream to produce a deuterium enriched second stage hydrogen gas stream, means for applying said deuterium enriched second stage hydrogen gas stream to said second stage cold catalytic exchange column in countercurrent relation to said liquid water stream to produce a deuterium depleted second stage hydrogen gas stream and a deuterium enriched second stage liquid water stream, means for applying said deuterium depleted second stage hydrogen gas stream to first stage catalytic exchange column, means for removing a portion of said deuterium enriched second stage liquid water stream produced by said second stage cold catalytic exchange column from said second stage.

The present invention can include an additional third BHW stage as described above and a fourth CECE stage. Furthermore, a pre-enrichment catalytic exchange column can advantageously be placed in the first stage to further enrich the liquid feed-forward or gas feed-forward streams before being passed to the second stage.

BRIEF DESCRIPTION OF THE DRAWINGS

In drawings which illustrate embodiments of the invention.

DETAILED DESCRIPTION OF PREFERRED EMBODIMENTS

In a conventional CIRCE process, a number of cascaded CIRCE stages are used to achieve the required level of purity of deuterium in the product stream. A stand-alone CECE process (where all electrolytic cells are charged to the heavy water cost) is more costly than a bithermal process because of high electrolytic cell costs. In the present invention, replacing all or most of the higher CECE stages of a conventional CIRCE process with bithermal stages reduces the higher-stage capital cost and shifts more separative work to the higher stages, reducing the reformer deuterium losses and increasing production.

Figure 1:
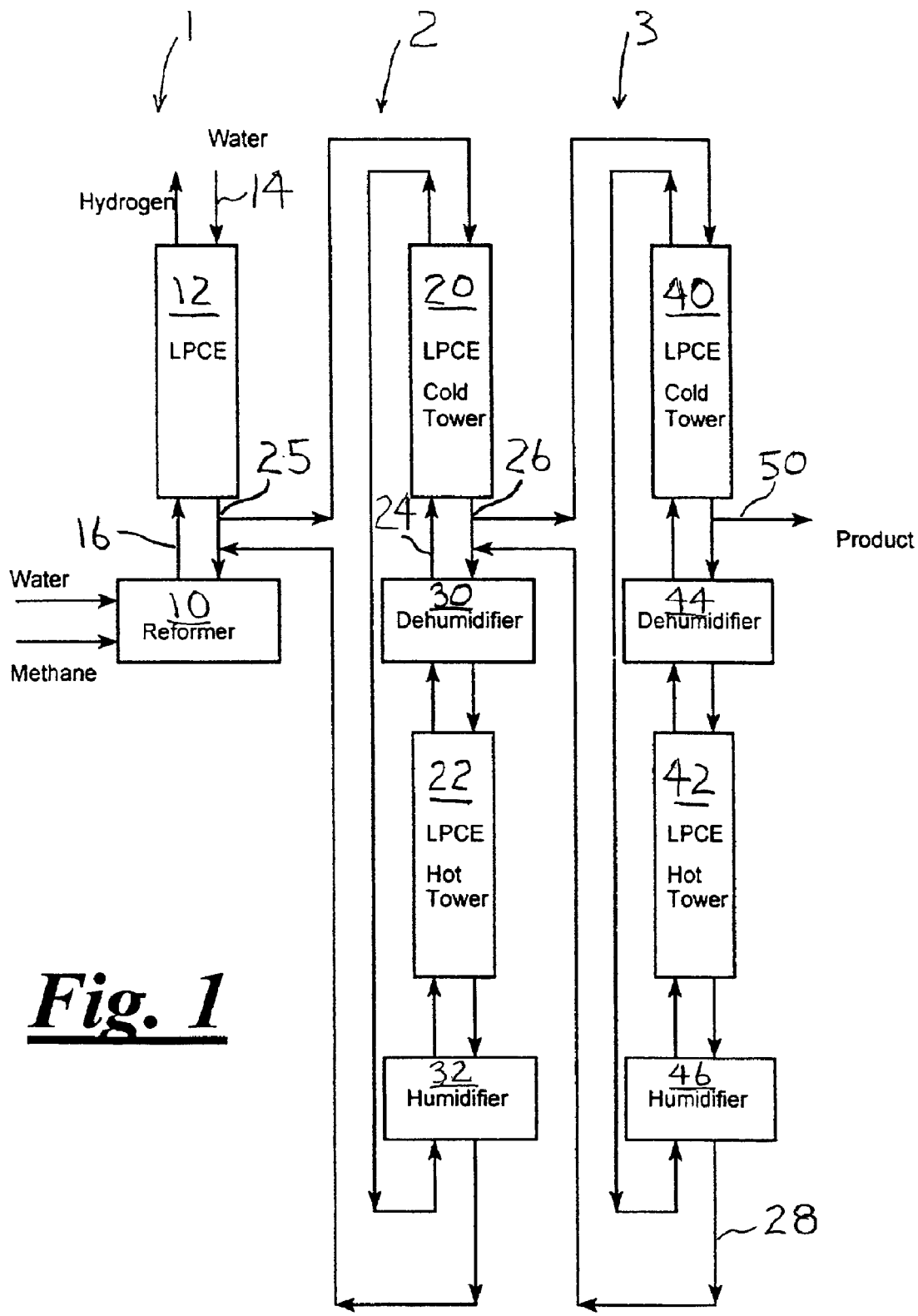
FIG. 1 is a simplified schematic flow diagram of a three-stage hybrid liquid-connected BHW-CIRCE process in accordance with the present invention.

Referring to FIG. 1, there is illustrated a simplified schematic of a three stage hybrid BHW-CIRCE process in accordance with the present invention. The first stage, generally indicated by reference numeral 1 is a CIRCE process. Stages 2 and 3, generally indicated by reference numerals 2 and 3 respectively are each a BHW process.

CIRCE stage 1, includes industrial reformer 10 and liquid phase catalytic exchange column 12. Input liquid feed water from feed source 14 passes down through liquid phase catalytic exchange column 12 into industrial reformer 10. Steam reformed hydrogen product stream 16 from reformer 10 passes upward through column 12 and is removed from the process at point 18. Column 12 contains a packed catalyst bed in which the hydrogen gas and liquid water pass in countercurrent exchange relation. The catalyst is wet-proofed, hydrophobic and active in the presence of water. In column 12, deuterium is stripped from the upflowing steam reformed hydrogen product stream 16 and is transferred to the down-flowing liquid water from feed source 14.

BHW stage 2 includes cold liquid phase catalytic exchange column 20 and hot liquid phase catalytic exchange column 22. In upper cold column 20, conditions favour the transfer of deuterium from upwardly flowing hydrogen stream 24 to downwardly flowing liquid water stream 26. In lower hot column 22, conditions favour the transfer of deuterium from the water to the hydrogen gas.

Figure 2:
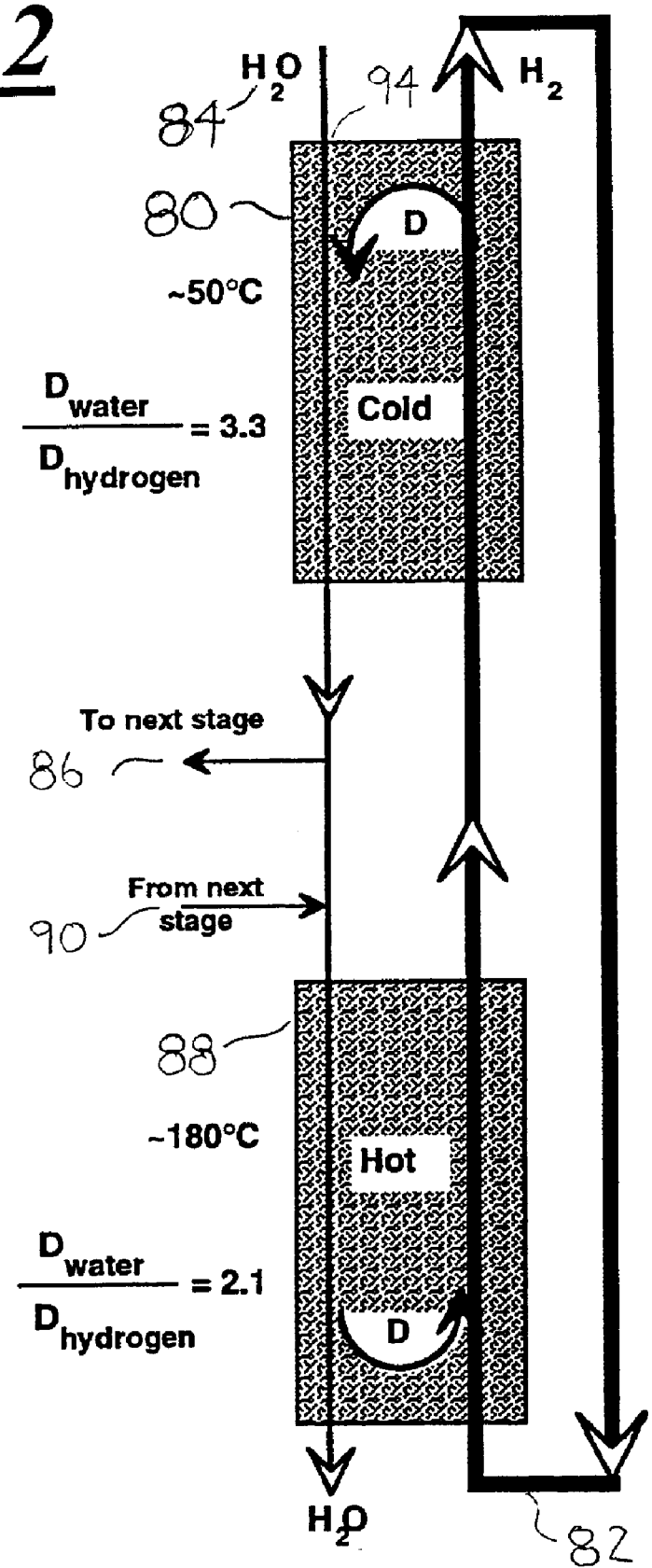
FIG. 2 is a simplified schematic flow diagram showing the mechanism of isotope separation in the BHW stages of the hybrid BHW-CIRCE process in accordance with the present invention.

FIG. 2 is a simplified schematic showing the mechanism by which the bithermal process effects separation of deuterium. The conditions shown in FIG. 2 are for illustrative purposes only and are not intended to necessarily reflect process condition encountered in each stage of the present invention. When upper cold column 80 is operated at a temperature of about 50° C., the separation factor of deuterium in water and hydrogen is 3.3 which favours a transfer of deuterium from the upward flowing hydrogen stream 82 to downward flowing liquid water stream 84. As a second stage, this enriches the concentration of deuterium in liquid water stream 84 from about 6,000 ppm to about 40,000 to 80,000 ppm. A portion of the enriched liquid water stream is drawn off at point 86 and applied as feed to the next upper stage (not shown). The depleted liquid water stream from the next upper stage is applied to the enriched liquid water stream entering lower hot column 88 at point 90. When lower hot column 88 is operated at a temperature of about 180° C., the separation factor of deuterium in water and hydrogen is 2.1 which favours a transfer of deuterium from the downward flowing liquid water stream 84 to the upward flowing hydrogen stream 82. The deuterium enriched hydrogen stream 82 flows upward into upper cold column 80 where deuterium transfer to the liquid water stream occurs as described above. The liquid water stream 84 entering the upper cold column 80 at point 94 and the liquid water stream exiting the lower hot column 88 are respectively drawn from and returned to the liquid water stream between the cold and hot columns of the previous stage (not shown).

Returning now to FIG. 1, the bithermal separation process described above with reference to FIG. 2 occurs in cold and hot columns 20 and 22. The liquid water feed for upper cold column 20 of stage 2 is drawn from the downward flowing deuterium enriched liquid water stream exiting liquid phase catalytic exchange column 12 of stage 1 at point 25. This is applied as the liquid water feed to the top of upper cold tower 20 of stage 2. After enrichment in cold column 20, a portion of the liquid water stream is drawn off at point 26 as applied as feed to stage 3. The remaining portion of the liquid water stream exiting cold column 20, together with the liquid water stream 28 exiting stage 3 are passed through dehumidifier 30, lower hot column 22 and humidifier 32. Deuterium exchange from the liquid water stream to the hydrogen stream occurs in lower hot column 22 in the manner described above and the depleted liquid water stream is passed back to steam industrial reformer 10 in stage 1. BHW Stage 3 is similar to stage 2 having upper cold liquid phase catalytic exchange column 40, lower hot liquid phase catalytic exchange column 42, dehumidifier 44 and humidifier 46. The final enriched product is drawn off the liquid water stream below upper cold column 40 at point 50.

Even with a 50% deuterium dilution in the reformer from methane at natural deuterium concentration, the reformer produces hydrogen gas at a concentration substantially higher than equilibrium with the water entering the reformer. This situation can be utilized. Deuterium can be transferred to the second stage either by a $H_2$ gas stream or a liquid $H_2O$ stream. In either case, these flows are relatively small compared to the flows in the first stage.

Figure 3:
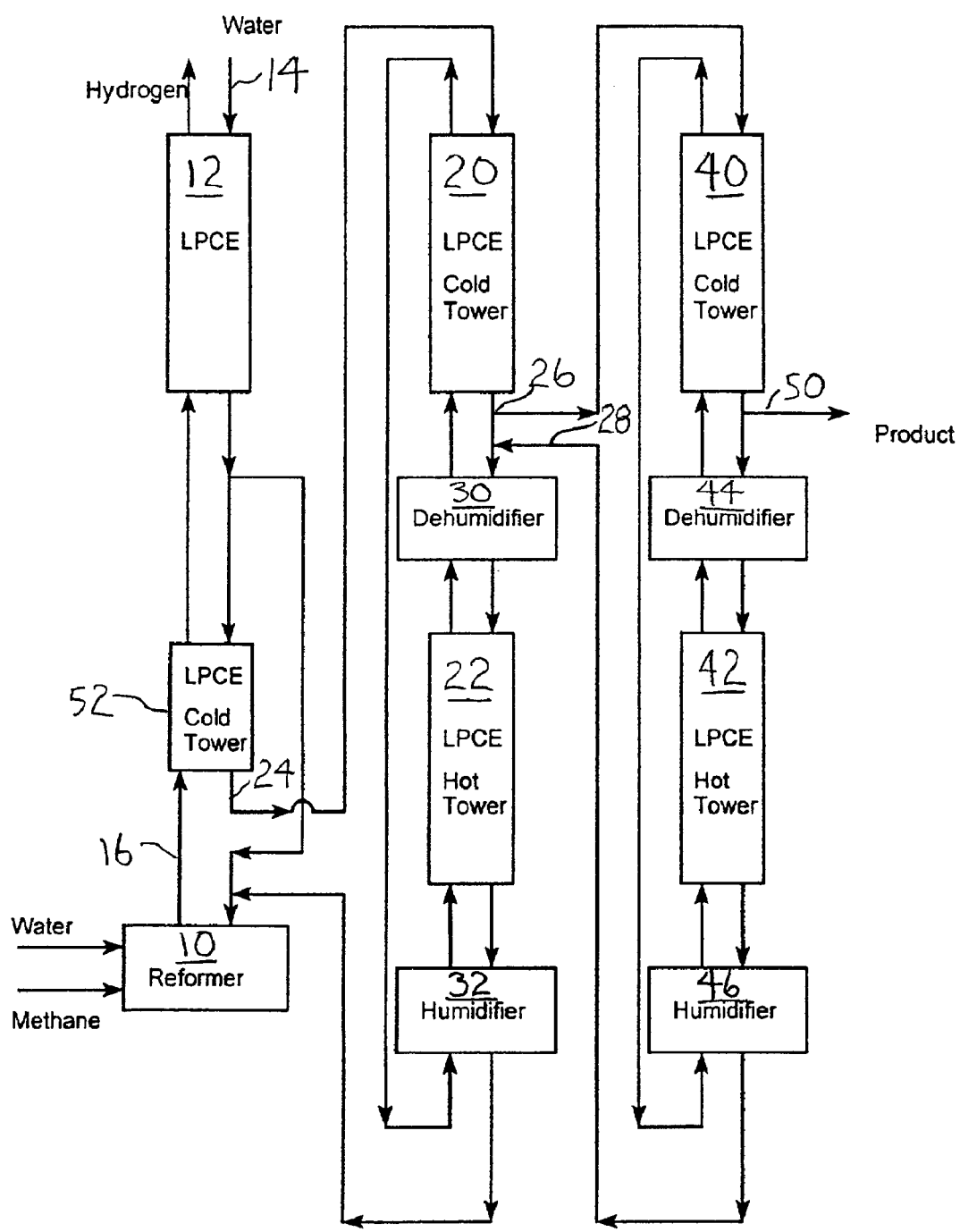
FIG. 3 is a simplified schematic flow diagram of a three-stage hybrid liquid-connected BHW-CIRCE process including a first stage pre-enrichment bed in accordance with the present invention.

Referring now to FIG. 3, there is illustrated a simplified schematic flow diagram showing the BHW-CIRCE three stage process of FIG. 1 as modified to include an enriched feed. In FIGS. 1 and 3, components that perform a like function are identified by like reference numerals. The embodiment of FIG. 3 differs from that of FIG. 1 in that cold liquid phase catalytic column 52 is placed between reformer 10 and column 12 in CIRCE stage 1. The liquid water feed to the second stage is pre-enriched by equilibration with reformer hydrogen in cold column 52. Where liquid water is used to transfer deuterium to the second stage, the stream being transferred is further enriched in column 52 by contact with the entire $H_2$ stream from the reformer. Relative to the first stage $H_2$ flow, the smallness of the transferring water flow allows it to approach equilibrium with the $H_2$. By this device, the deuterium concentration of the $H_2O$ in the transfer stream can be substantially boosted at little cost. This results in a reduction in both the height of the second stage towers and in their diameter, effecting considerable overall saving.

Losses of deuterium-bearing substances from the reformer are a major factor in setting the enrichment of deuterium by the first stage. These losses are directly proportional to the concentration of the water entering the reformer.

Consider a case in which the water entering the reformer is enriched in deuterium to 5000 ppm. In the conventional arrangement with water feeding deuterium to the second stage, the deuterium content of the water to the second stage would be around 5150 ppm (slightly higher than the concentration feeding the reformer since a small amount of deuterium is removed from the water returning after passing through the second stage). Water flow to the second stage would be around 10.5% of the water flow in the first stage.

Next, consider a case according to the present invention. At a typical temperature for a cold exchange column of 60° C., the separation factor for water and hydrogen is about 3.15. For the same water concentration entering the reformer, contact in the presence of exchange catalyst between the gas leaving the reformer and the small water stream feeding the second stage increases the deuterium concentration of the water to around 7000 ppm. This results in a corresponding decrease in all second stage flows of over 25%. The second stage is also shortened since the feed to it is more than 25% pre-enriched.

Figure 4:
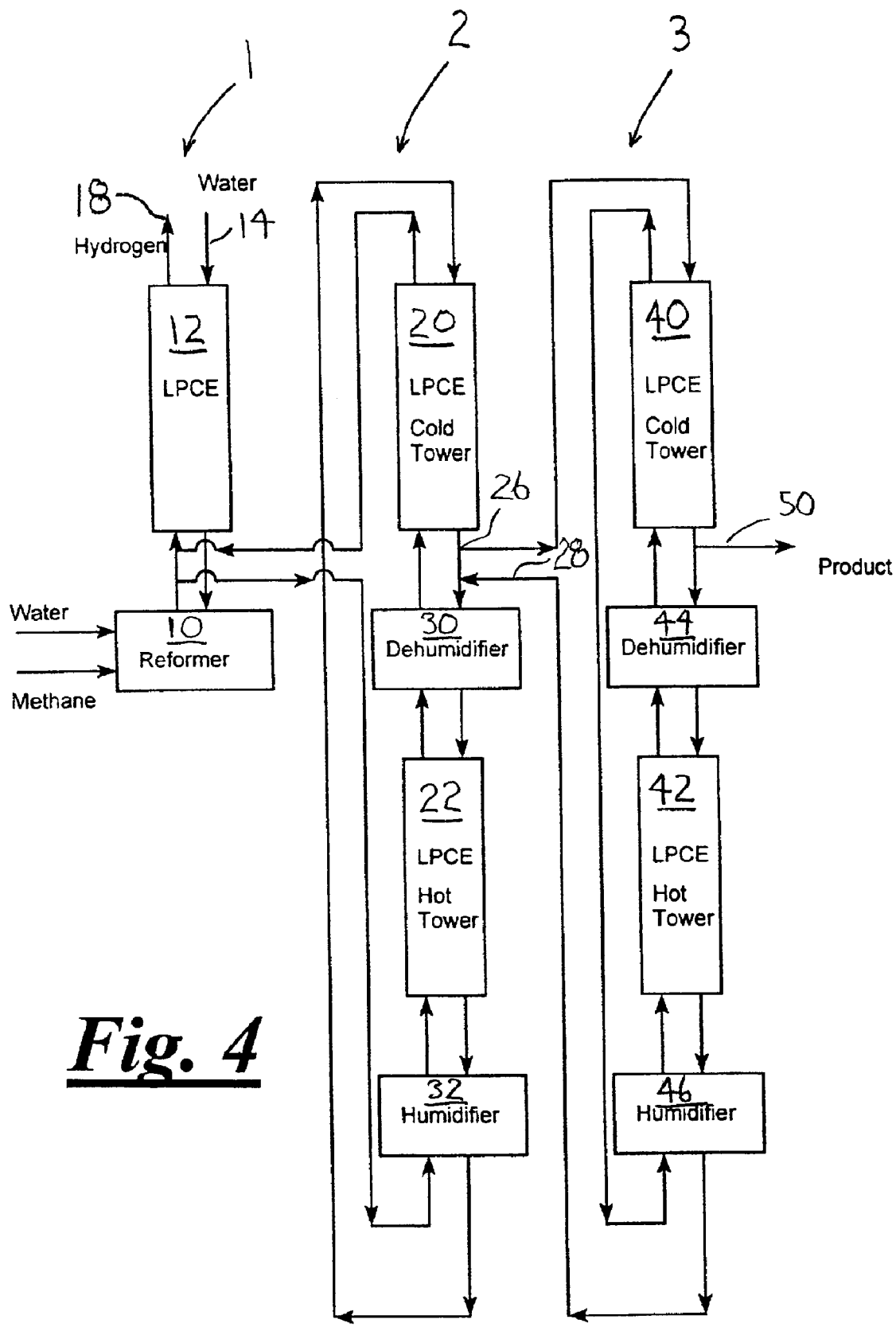
FIG. 4 is a simplified schematic flow diagram of a three-stage hybrid gas-connected BHW-CIRCE process in accordance with the present invention.

Referring now to FIG. 4, there is illustrated a simplified schematic flow diagram showing an alternative embodiment of the present invention. In FIGS. 1 and 4, components that perform a like function are identified by like reference numerals. The embodiment of FIG. 4 differs from that of FIG. 1 in that the first and second stages are gas-connected rather than liquid-connected. In CIRCE first stage 1, the upflowing steam reformed hydrogen product stream is applied as feed to the bottom of hot liquid phase catalytic exchange column 22 of BHW second stage 2 through humidifier 32. The hydrogen stream exiting the top of cold liquid phase catalytic exchange column 20 is returned to the bottom of liquid phase catalytic exchange column 12 of CIRCE first stage 1.

Figure 5:
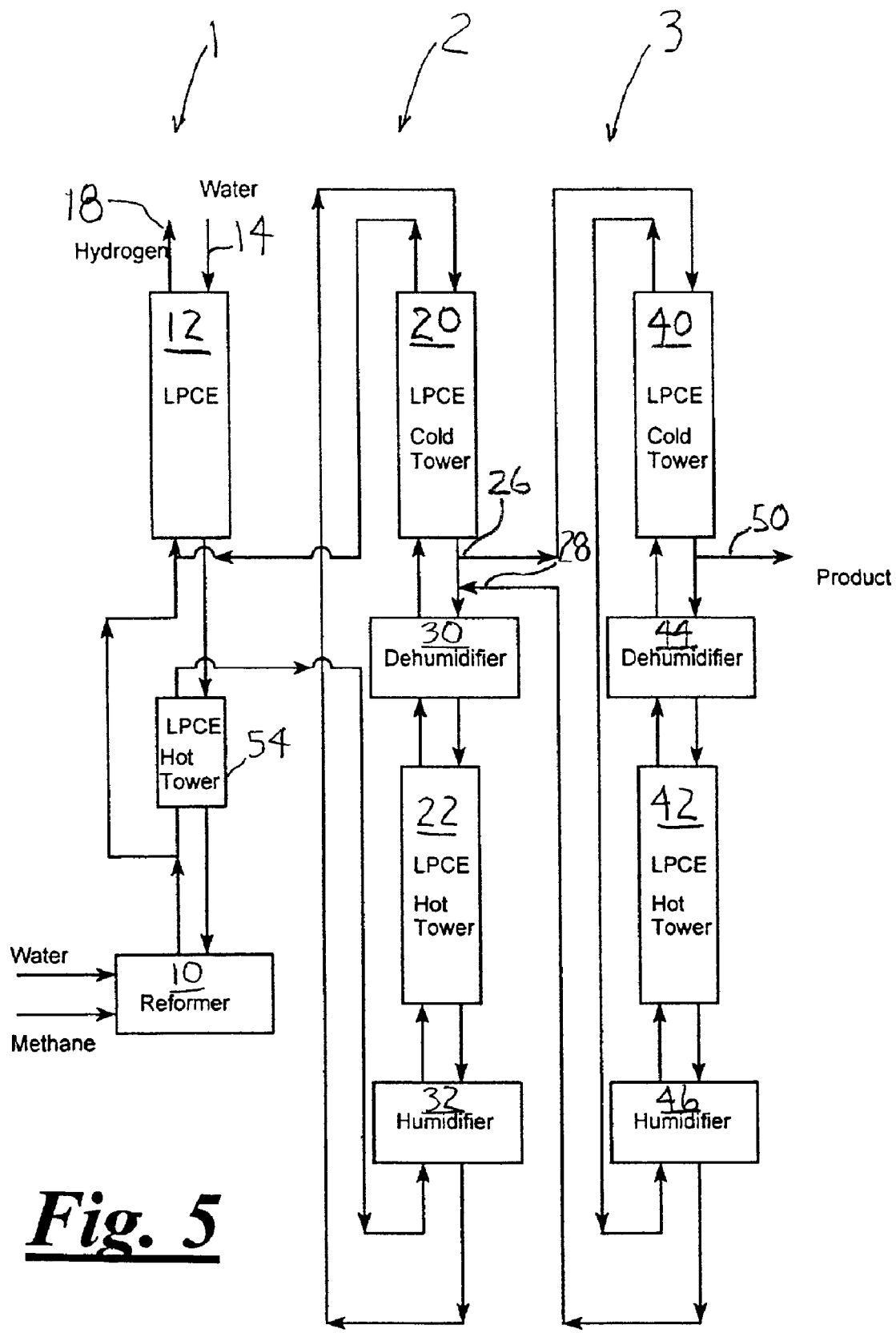
FIG. 5 is a simplified schematic flow diagram of a three-stage hybrid gas-connected BHW-CIRCE process including a first stage pre-enrichment bed in accordance with the present invention.

With water feed transferring deuterium from the CIRCE stage 1 to the BHW stage 2, the deuterium concentration in the hydrogen gas leaving the BHW stage 2 is similar to that of the hydrogen leaving the reformer. So replacing water feed from the CIRCE stage 1 to the BHW stage 2 with gas feed from the CIRCE stage 1 to the BHW stage 2 as a means for transfer of deuterium (and similarly from BHW stage 2 to BHW stage 3) produces a broadly comparable result with similar flows and deuterium concentrations in the BHW stages. However, in many circumstances, economic analysis shows that connecting to BHW stages using hydrogen gas feed produces a modest cost advantage over connecting with water feed. On the other hand, using water feed between stages is somewhat more versatile since the pressure of the BHW stages can be set independently from that of the reformer. Also, where the reformer is producing synthesis gas for ammonia production (3 parts hydrogen to one part nitrogen), water feed allows exclusion of nitrogen from circulation in the BHW stages. Exclusion of nitrogen reduces the volume of the BHW stages in direct proportion to the volume of gases in the BHW circulation Referring now to FIG. 5, there is illustrated a simplified schematic flow diagram showing the gas-connected BHW-CIRCE three stage process of FIG. 4 as modified to include an enriched feed. In FIGS. 4 and 5, components that perform a like function are identified by like reference numerals. The embodiment of FIG. 5 differs from that of FIG. 4 in that hot liquid phase catalytic column 54 is placed between reformer 10 and column 12 in CIRCE stage 1. The hydrogen gas feed to the second stage is pre-enriched by contacting the reformer liquid feed in hot column 54. This is advantageous where the deuterium concentration of the hydrogen gas is unusually low relative to the deuterium concentration of water entering the SMR. This would occur where water provided an unusually low proportion of the hydrogen produced in the SMR, for example where air is added, a process generally known as secondary reforming. In such a situation, and where deuterium is transferred to the BHW stage 2 as hydrogen gas, the deuterium content of this hydrogen can be increased by contact in a catalytic bed between this small hydrogen stream and the entire water flow entering the SMR. To maximize transfer of deuterium from the water to the hydrogen, this contact should be carried out at the highest possible temperature to utilize the decrease in separation factor with increasing temperature (e.g. $\alpha$ is 2.0 at 200° C.).

Figure 6:
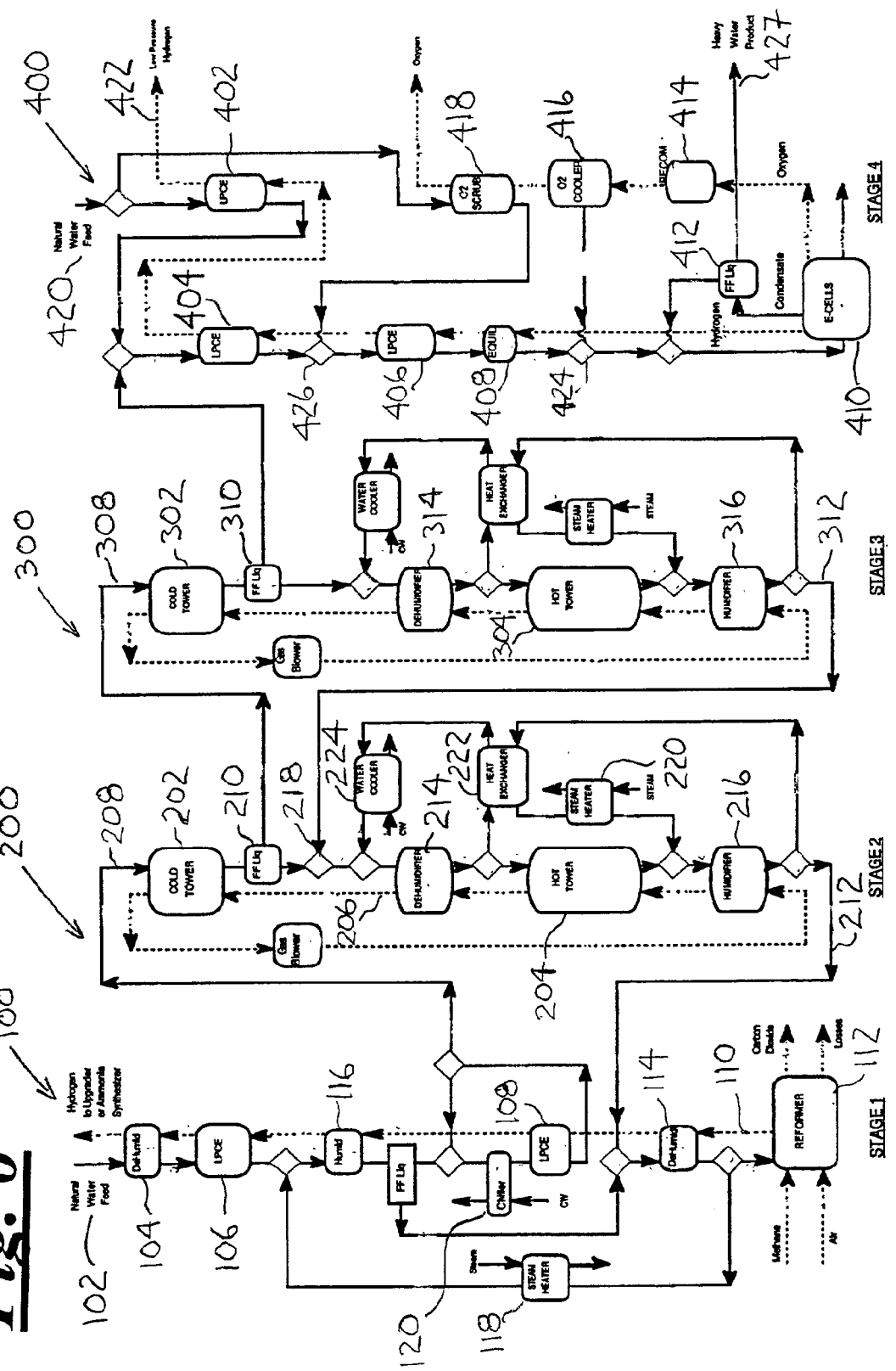
FIG. 6 is a detailed schematic flow diagram of a four stage hybrid liquid-connected BHW-CIRCE process including a first stage pre-enrichment bed in accordance with the present invention.

Referring now to FIG. 6, there is illustrated a schematic flow diagram showing in more detail a hybrid BHW-CIRCE process in accordance with the present invention. The process of FIG. 6 is a liquid connected four stage process. The first stage identified generally by reference numeral 100 is a CIRCE process with a cold liquid phase catalytic exchange tower for pre-enrichment. The second and third stages generally indicated by reference numerals 200 and 300 respectively are each a BHW process. Thus the first three stages are a CIRCE-BHW-BHW cascade similar to that illustrated in FIG. 3. The additional fourth stage generally indicated by reference numeral 400 is a conventional CECE process. The use of a final CECE stage after the last BHW stage has been found to be desirable as it avoids or reduces the complexities associated with the bithermal process at very high deuterium concentrations. As is known to those skilled in the art, at high concentrations, curving equilibrium lines force the liquid recycle to bend the operating lines and the heat of reaction cools the hot exchange columns and heats the cold exchange columns in the BHW process.

In FIG. 6, input natural feed water is introduced into the process at input 102, through dehumidifier 104 into first liquid phase catalytic exchange column 106. Column 106 contains a packed catalyst bed in which the hydrogen gas and liquid water pass in countercurrent exchange relation. The catalyst is wet-proofed, hydrophobic and active in the presence of water. In column 106, deuterium is stripped from the upflowing steam reformed hydrogen product stream 110 and is transferred to the down-flowing liquid water from feed source 102. In the CIRCE stage 1, deuterium is transferred from hydrogen to water by means of catalytic exchange in units 106 and 108. The temperature and humidity of gas entering and leaving these exchange units is generally controlled by direct contact with water, appropriately cooled or heated by indirect contact in heat exchangers with cooling water (chiller unit 120) or steam (steam heater 118), respectively. Direct contact is performed in a tower packed with material suitable for heat transfer. Because the water flow to the BHW stage 2 is relatively small, the performance of this heat transfer tower can be improved by recirculating water around the unit and drawing off only a proportion of this water flow as feed to the BHW stage 2.

First CIRCE stage 100 also includes industrial steam reformer 112. Reformer 112 can be of any of a number of commercially used steam reformers including a conventional air-fed reformer producing an ammonia synthesis gas and a more modem design consisting of a primary reformer plus high temperature shift with a pressure-swing adsorption (PSA) unit to purify the product hydrogen stream. The PSA-type reformer is preferred as it removes from the tail gas traces of CO which can poison Pt catalysts in the catalyst exchange columns. Modifications to adapt commercial reformers to use in the BHW-CIRCE can include nitrogen removal from the methane feed to the steam reformer and $CO_2$ removal from the tail gas prior to recycle of this stream to reduce the methane feed to the steam reformer.

Liquid water that has been enriched in liquid phase catalytic exchange column 106 passes through humidifier 116 and dehumidifier 114 and is applied as feed to steam reformer 112. Deuterium is stripped from the upflowing steam reformed hydrogen product stream 110 and is transferred to the down-flowing liquid water from feed source 102 in first and second liquid phase catalytic exchange columns 106 and 108, also passing through dehumidifier 114 and humidifier 116 to adjust water and hydrogen temperatures appropriate to the subsequent exchange columns. Second liquid phase catalytic exchange column 108 acts as a first stage liquid feed-forward pre-enrichment bed with liquid recycle.

Second stage 200 is a BHW process and includes cold liquid phase catalytic exchange column 202 and hot liquid phase catalytic exchange column 204. As described in respect of FIG. 1, in upper cold column 200, conditions favour the transfer of deuterium from upwardly flowing hydrogen stream 206 to downwardly flowing liquid water stream 208. In lower hot column 204, conditions favour the transfer of deuterium from downwardly flowing liquid water stream 208 to upwardly flowing hydrogen stream 206.

Hydrogen gas is recycled around the second stage. Cold hydrogen leaving column 202 is heated and humidified by direct contact with hot water in humidifier 216. The heated and humidified hydrogen then passes through the hot exchange column 204 where it becomes increasingly enriched in deuterium as a result of stripping deuterium from the counterflowing water stream. Hot hydrogen leaving column 204 is cooled and dehumidified in dehumidifier 204 by direct contact with cold water. The cooled hydrogen passes through cold exchange tower 202 and is steadily stripped of deuterium by the counterflowing water stream. A proportion of the water stream, now significantly more enriched in deuterium, is split off from the main water flow and fed to the third stage of the process 300. To be effective, dehumidifier 214 requires a larger flow of cold water than that leaving the cold exchange column 202. Additional water flow is provided as another recycling water stream, which rejects heat in exchanger 222 and cooler 224. Cooling by dehumidifier 214 is controlled by the temperature of the recycle flow leaving cooler 224. Similarly, humidifier 216 requires a larger flow of hot water than that leaving hot exchange column 204. Additional water flow is provided as another recycling water stream, which collects heat in exchanger 222 and steam heater 220. To reduce the quantities of steam fed to steam heater 220 and of cooling water fed to water cooler 224, heat is exchanged between the two recycle streams in heat exchanger 222.

The liquid water feed 208 for upper cold column 202 of stage 2 is drawn from the downward flowing deuterium enriched liquid water stream exiting liquid phase catalytic exchange column 108 of stage 1. After enrichment in cold column 202, a portion of the liquid water stream is drawn off at liquid feed forward point 210 and is applied as feed to the next BHW stage 300. The remaining portion of the liquid water stream exiting cold column 202, together with the liquid water stream 312 exiting the next BHW stage 300 are passed through dehumidifier 214, lower hot column 204 and humidifier 216. Deuterium exchange from the liquid water stream to the hydrogen stream occurs in lower hot column 204 in the manner described above and the depleted liquid water stream 212 is passed back to CIRCE stage 100 as an input to reformer 112 through humidifier 114.

Third stage 300 is a BHW process and operates in the same manner as the second stage described above with like components performing like functions. The liquid water feed stream 308 for upper cold column 302 is drawn from liquid feed forward point 210 of the second stage 200 and the depleted liquid water stream 312 is passed back to BHW stage 100 between upper cold column 202 and lower hot column 204 at point 218.

The BHW process is not well suited to enrichment of heavy water above around 20% deuterium because heat of reaction (when deuterium is transferred from hydrogen to water) increases temperature in the cold tower and lowers temperature in the hot tower. Although the heat of reaction is quite small, the temperature rise would be amplified by the repeated contacts between the water and hydrogen in the exchange columns. Also, with rising concentrations, the equilibrium ratio of deuterium in water to that in hydrogen begins to decrease appreciably, reaching a limiting value of 1.0 for pure deuterium). Optimum functioning of a BHW stage depends on maintaining the approximate equality between the hydrogen to water flow ratios and the equilibrium value for the temperature of contact. Changing equilibrium values would disrupt maintenance of the ratios.

Accordingly, the final stage of the process uses a monothermal process, the CECE (Combined Electrolysis and Catalytic Exchange) process. With CECE, the function of the BHW process's hot tower (to produce hydrogen enriched in deuterium by catalytic exchange) is replaced by electrolytic conversion of water enriched in deuterium into hydrogen at the same concentration. Fourth stage 400 is a conventional CECE process and comprises, liquid phase catalytic exchange columns 402, 404, 406, liquid-vapour equilibrator 408, electrolytic cells 410, purification unit 412, hydrogen oxygen recombiner 414, oxygen gas stream cooler 416, and oxygen stream deuterium vapour scrubber 418. Natural feed water from source 420 passes down through liquid phase catalytic exchange column 402 and together with deuterium enriched liquid feed water from liquid feed forward point 310 of BHW stage 300 is applied as feed to liquid phase catalytic exchange columns 404 and 406 and passes through equilibrator 408 to electrolytic cells 410. Columns 402, 404 and 406 each contains a packed catalyst bed in which the hydrogen gas and liquid water pass in countercurrent exchange relation. The catalyst is wet-proofed, hydrophobic and active in the presence of water. The preferred catalyst material is that described above with reference to FIG. 1.

Electrolytic cells 410 not only provide a bottom reflux by converting the deuterium enriched liquid leaving liquid phase catalytic exchange column 408 into hydrogen gas, but also enrich the electrolytic cell liquid inventory. The electrolytic hydrogen produced in electrolytic cells 410 is depleted in deuterium relative to the electrolyte by virtue of the kinetic isotope effect inherent in the hydrogen evolution reaction. The electrolytic cell separation factor is typically 5–6. Hydrogen gas generated in electrolytic cells 410 flows up through equilibrator 408 which brings the deuterium concentration of water vapour in the hydrogen gas stream into isotopic equilibrium with the liquid water input. The hydrogen gas flows through liquid phase catalytic exchange columns 404, 406 and 408 and is removed from the process at point 422.

The liquid condensate generated by electrolytic cells 410 is purified through reverse osmosis feed forward unit 412 which removes the electrolyte material and is delivered at point 427 as the final purified heavy water product. The electrolytic oxygen stream from electrolytic cells 410 contains small amounts of hydrogen enriched in deuterium. Recombination of this hydrogen to form water in recombiner 414 allows the deuterium to be removed by cooler 416 and vapour scrubber 418 and returned to the liquid water stream at points 424 and 426.

Figure 7:
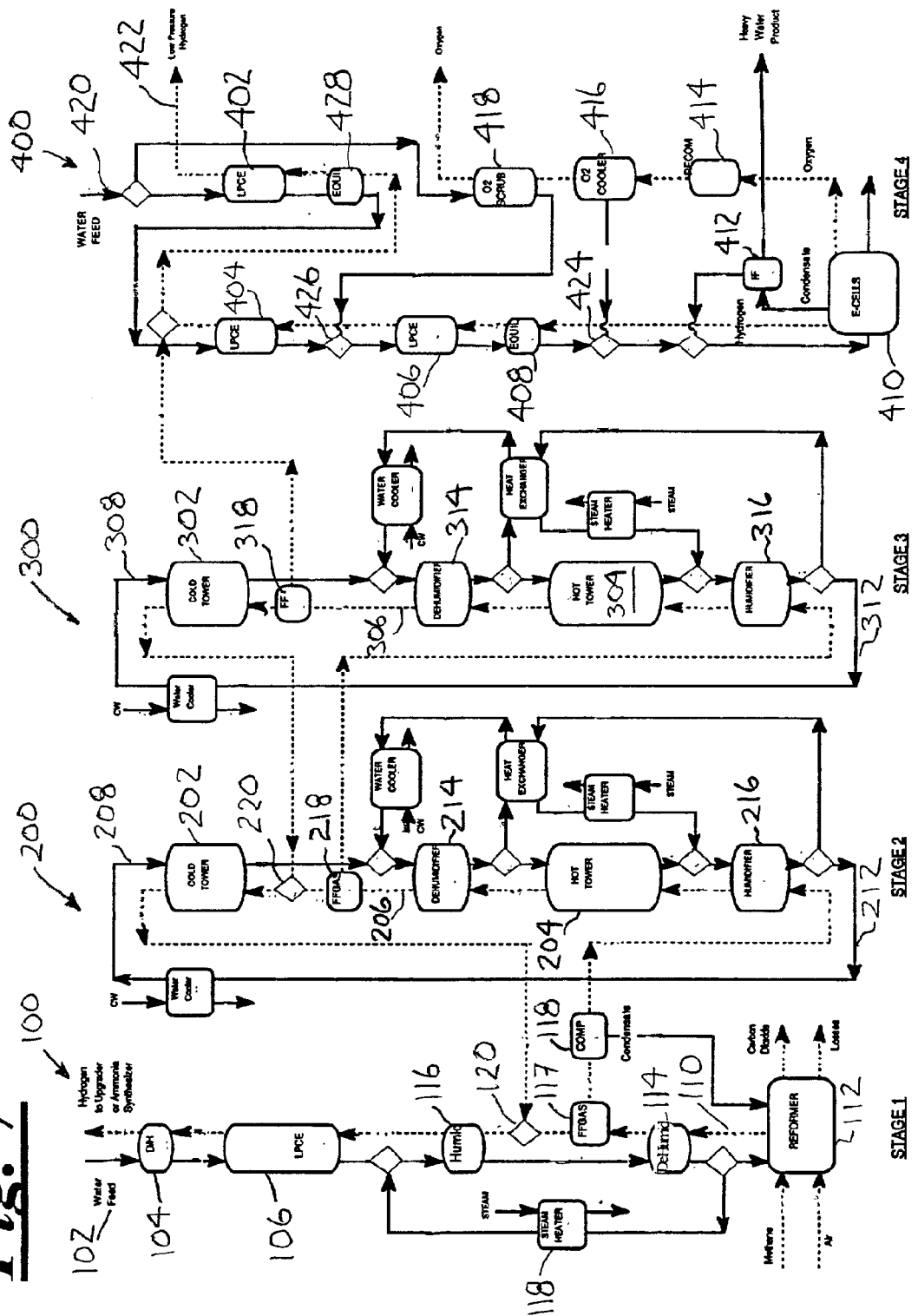
FIG. 7 is a detailed schematic flow diagram of a four stage hybrid gas-connected BHW-CIRCE process in accordance with the present invention.

Referring now to FIG. 7, there is illustrated a schematic flow diagram showing in more detail of a gas connected BHW-CIRCE four stage process in accordance with the present invention. The first stage identified generally by reference numeral 100 is a CIRCE process. The second and third stages generally indicated by reference numerals 200 and 300 respectively are each a BHW process. Thus the first three stages are a CIRCE-BHW-BHW cascade similar to that illustrated in FIG. 4. The additional fourth stage generally indicated by reference numeral 400 is a conventional CECE process and is similar to the fourth stage described with reference to FIG. 6. In FIGS. 6 and 7, components that perform like functions are identified by like reference numerals.

In the gas connected process of FIG. 7, the gas feed for BHW second stage 200 is drawn from the steam reformed hydrogen stream produced by industrial reformer 112 through humidifier 114, feed-forward gas unit 117 and compressor 118 and is applied to the bottom of hot liquid phase catalytic exchange column 204 of the second stage through humidifier 216. Deuterium depleted hydrogen gas exiting the top of cold tower 202 is passed back to CIRCE first stage 100 at point 120.

BHW second and third stages 200 and 300 are similarly gas interconnected. Hydrogen is drawn from stream 206 by feed-forward gas unit 218 and is applied to the bottom of hot tower 304 through humidifier 316. Deuterium depleted hydrogen gas exiting the top of cold tower 302 is passed back to BHW first stage 200 at point 220.

Hydrogen is drawn from stream 306 of BHW third stage 300 by feed forward unit 318 and is applied to the bottom of liquid phase catalytic exchange column 402 of CECE fourth stage 400 through equilibrator 428.

In all liquid phase catalytic exchange columns, with the exception of hot LPCE columns used in the bithermal BHW stages and for feed-forward pre-enrichment in the gas-connected embodiment of the present invention, the preferred catalyst material is a Group VIII metal having a liquid-water repellant organic polymer or resin coating thereon selected from the group consisting of polyfluorocarbons, hydrophobic hydrocarbon polymers of medium to high molecular weight, and silicones, and which is permeable to water vapour and hydrogen gas. These types of catalysts are described in U.S. Pat. Nos. 3,981,976 and 4,126,687. For hot column use, the catalyst can be a composite of Teflon™ and polymerized styrene-divinylbenzene (SDB). Alternatively, a catalyst such as described by den Hartog et al. in U.S. Pat. No. 4,471,014 or other catalysts that exhibit satisfactory activity at 150° C. or above can be used.

The shortcomings of the conventional CIRCE process and the advantages of the BHW-CIRCE hybrid process in accordance with the present invention has been demonstrated by a detailed economic analysis comparing a number of conventional CIRCE processes with three hybrid BHW-CIRCE processes. The simulation is based on the use of a primary reformer plus high temperature shift with a pressure-swing adsorption unit. The PSA-type unit typically operates at a pressure of 2170 kPa. Accordingly, the bithermal stages of a the BHW-CIRCE process have been modelled at this pressure for reasons including that there is only a weak pressure effect on cost, operating at higher pressures favours higher hot column temperatures which could adversely affect the stability of catalysts, and operating stages with different pressures would require an expensive compressor in a gas-connected process. The analysis is based on a steady-state hydrogen-water heavy water plant simulation code V8.0 HWPsim which iterates to convergence by continuous substitution, with some nesting of iteration schemes. All sizing and costing parameters used to compare the process variants are summarized in Tables 1 and 2.

TABLE 1

| | Plant Sizing Parameters | | |
|---|---|---|---|
| Plant Feeds | Natural water, ppm D | | 130 |
| | Methane, ppm D | | 120 |
| Reformer | $H_2$ production (PSA, Conventional), MMSCFD | | 101, 117 |
| | Pressure (PSA, Conventional), kPa | | 2 170, 2 860 |
| | H-D separation factor (PSA, Conventional), $H_2O/H_2$ | | 1.50, 1.57 |
| | H-D separation factor (PSA, Conventional), $H_2O/CH_4$ | | 1.18, 1.57 |
| | Inventory (PSA, Conventional), kmol $H_2O$ | | 3 400, 4 000 |
| | Water loss (PSA, Conventional), % of $H_2O$ feed | | 0.473, 0.500 |
| | Hydrogen loss (PSA, Conventional), % of $H_2$ flow | | 0.0127, 0.154 |
| | Methane loss (PSA, Conventional), % of $H_2$ flow | | 0.008, 0.026 |
| High Pressure LPCE Beds | Pressure, kPa | | 2 170 |
| | Temperature (bithermal hot tower), °C. | | 165 |
| | Temperature (bithermal cold tower), °C. | | 57 |
| | Standard $K_y a$, mol(D) · $m^{-3}$ · $s^{-1}$ (25° C., 1 atm.) | | 536 |
| | $k_D/k_R$ ratio | | 2.8 |
| | Catalyst cost, $ · $L^{-1}$ | | 75 |
| | G flux, mol · $m^{-2}$ · $s^{-1}$ | | 400 |
| Low Pressure LPCE Beds | Pressure, kPa | | 103 |
| | Temperature, °C. | | 60 |
| | $K_y a$ at conditions (fixed), mol(D) · $m^{-3}$ · $s^{-1}$ | | 856 |
| | kDa/kR ratio | | 2.8 |
| | G flux, mol · $m^{-2}$ · $s^{-1}$ | | 80 |
| Heat Transfer Sections | Heat transfer rate, kW · $m^{-3}$ · $K^{-1}$ | | 100 |
| | Gas flux | | same as adjacent LPCE |
| | Cooling water temperature, °C. | | 30 |
| | Steam temperature, °C. | | 305 |
| Oxygen Stream Vapour Scrubber | Temperature, °C. | | 60 |
| | Pressure, $kPa_{(g)}$ | | 103 |
| | $K_G a$, mol(D) · $m^{-3}$ · $s^{-1}$ · $kPa^{-1}$ | | 6.4 |
| | G + V flux, mol · $m^{-2}$ · $^{-1}$ | | 85 |
| Equilibrators | $K_G a$, mol(D) · $m^{-3}$ · $s^{-1}$ · $kPa^{-1}$ | | 6.4 |
| | Gas flux | | same as adjacent LPCE |
| Electrolytic Cells | Unit size, kA | | 105 |
| | Voltage, kA | | 1.85 |
| | Inventory (lower stages, final stage), L · $kA^{-1}$ | | 15, 3 |
| | Water losses (lower stages, final stage), % of $H_2$ | | 0.068, 0.0068 |
| | Hydrogen losses (lower stages, final stage), % of $H_2$ | | 0.068, 0.0068 |
| | H-D separation factor (lower stages, final stage) | | 5.0, 2.5 |
| Oxygen Stream $H_2$ Recombiner | Design safety factor | | 1.5 |
| | Catalyst cost, $ · $L^{-1}$ | | 150 |

TABLE 2

| | Plant Costing Parameters | | |
|---|---|---|---|
| HWP Plant | Capacity factor | | 0.9 |
| | Construction time, years | | 2.25 |
| Reformer | Modification costs (PSA, Conventional), k$ | | 38 124, 31 250 |
| | Extra operating costs (PSA, Conventional), k$ · $a^{-1}$ | | 15.7, 4.3 |
| | Extra power requirement (PSA, Conventional), kW | | 9906, 5000 |
| | Guard bed cost (PSA, Conventional) | | 0, 0 |
| Exchange Catalyst | Cost, $ · $L^{-1}$ | | 75 |
| | Lifetime, years | | 5 |
| Recombiner Catalyst | Cost, $ · $L^{-1}$ | | 150 |
| Electrolytic Cells | Cost, (lower stages, final stage), k$ · $MW^{-1}$ | | 585, 730 |
| | Power distribution costs, k$ | | 0 |
| | $H_2$ credit (CIRCE-C, CIRCE-B), $ · $m^{-3}$ | | 0.090, 0.0 |
| Operating Costs | Direct labor, k$ · $a^{-1}$ | | 8 * 65 |
| | Production royalties | | 0 |
| | Feed water treatment cost | | 0 |
| | Electricity cost, $ · $kWh^{-1}$ | | 0.027 |
| | Steam cost, $ · $kg^{-1}$ | | 0 |
| | Cooling water cost, $ · $m^{-3}$ | | 0.132 |
| | Electrolytic hydrogen sale value, $ · $m^{-1}$ STP | | 0.024 |
| Capital Costing | US dollar, $Canadian | | 1.17 |
| | Cost index (1, 2) | | 392, 502 |
| | Compressor cost contingency | | 1.1 |
| | Building & Yard Improvement factor, % | | 3 |
| | Complexity/Contingency/Contractor Fees, % | | 36.5 |
| | Deuterium analytical costs, k$ | | 150 |
| | Engineering costs, k$ | | 0 |

TABLE 2-continued

Plant Costing Parameters

| | | |
|---|---|---|
| Capital Financing | Pay-back period, years | 20 |
| | Interest rate, % | 10 |

The base-case parameters includes a catalyst activity of 536 mol(D)·m$^{-3}$·s$^{-1}$ (25° C., 1 atm), a catalyst cost of 75$·L$^{-1}$, a 10% interest rate and a twenty-year capital recovery period. Also, a fixed 38.1 M$ capital charge is assigned to D$_2$O costs to cover reformer modifications (primarily deuterium recovery from D$_2$O blowdown).

Table 3 summarizes the comparison of process variants based on a PSA type reformer.

stage conventional CIRCE process. Spreading the separative work out over more stages reduces the overall catalyst requirements and lowers reformer losses, increasing production by 2%. However, given the same production and second stage extraction, a lower first-stage feed-forward concentration requires more electrolytic cells. The increased capital investment in electrolytic cells more than offsets the benefits of a four stage conventional CECE design.

TABLE 3

Comparison of CIRCE Plant Variants

| | CIRCE-C 3-stage plant | CIRCE-C 3-stage plant, pre-enrich bed | CIRCE-C 4-stage plant, pre-enrich bed | CIRCE-B(L) 3-stage plant, pre-enrich bed | CIRCE-B(L) 4-stage plant, pre-enrich bed | CIRCE-B(G) 4-stage, gas feed-forward |
|---|---|---|---|---|---|---|
| Case | A | B | C | D | E | F |
| Lowest Unit Cost, $/kg | 240 | 227 | 225 | 198 | 192 | 195 |
| Production, Mg · a$^{-1}$ | 49.2 | 50.4 | 51.5 | 56.7 | 57.1 | 57.2 |
| First Stage feed-forward Concentration, ppm | 7364 | 9568 | 8180 | 4040 | 3857 | 1367 (gas) |
| Reformer Water conc., ppm D | 5582 | 4850 | 4560 | 2164 | 1994 | 2050 |
| Reformer losses, % of product | 23.1 | 19.7 | 18.1 | 7.92 | 7.25 | 7.44 |
| First-stage Enrichment (excluding pre-enrich bed) | 56.6 | 48.7 | 45.8 | 21.1 | 19.1 | 20.0 |
| Total First-stage Enrichment | 56.6 | 73.6 | 63.0 | 31.1 | 30.0 | 20.0 |
| First stage catalyst volume, m$^3$ | 63.4 | 62.0 | 61.1 | 55.5 | 55.7 | 53.5 |
| First-stage feed-forward pre-enrich bed catalyst volume, m$^3$ | — | 2.35 | 0.72 | 3.10 | 4.09 | — |
| Capital investment, M$ (prorated to 50 Mg · a$^{-1}$ Product)* | 58.7 | 56.5 | 56.8 | 53.1 | 52.2 | 53.1 |
| Electrolytic cell Cost | 3869 | 3067 | 3611 | 1030 | 295 | 332 |
| Catalyst Cost, k$ | 4788 | 4676 | 4610 | 6194 | 6166 | 6531 |
| Inventory, kmol D$_2$O | 285 | 245 | 191 | 88.6 | 38.5 | 50.4 |

*Note:
Only non-reformer related capital is pro-rated to a 50 Mg · a$^{-1}$ production plant size.

Case A is a three stage conventional CIRCE process. Case A has a production of 49.2 Mg·a$^{-1}$ and a required capital investment of 58.4 M$. The high second and third stage electrolytic cell costs (3.87 M$) have driven up the first-stage enrichment to 57-fold, requiring a large first stage catalyst volume (63.4 m$^3$) and producing a high reformer deuterium leakage (23% of product rate).

Case B is a three stage conventional CIRCE process with a liquid feed-forward pre-enrichment bed. The use of the pre-enrichment bed significantly reduced the unit cost by 5.5% to 227 $·kg$^{-1}$. Enrichment in the main 59.6 m$^{-3}$ first stage catalyst column is 49-fold. The small 2.35 m$^{-3}$ feed-forward pre-enrichment bed boosted the overall stage enrichment to 74-fold, a 51% increase in enrichment for a 4% increase in catalyst volume. Boosting the feed forward concentration allows the main catalytic column enrichment to drop, reducing the reformer deuterium concentration by 13% (reducing reformer losses) and increasing production to 50.4 Mg·a$^{-1}$. The higher first-stage feed-forward concentration reduces the size of the higher stages. Most notably, electrolytic cell costs are down 21% to 3067 k$.

Case C is a four stage version of Case B having an additional CECE stage as the fourth stage. There is essentially no difference in unit cost between a three and a four Case D is a three stage hybrid BHW-CIRCE process in accordance with the present invention, having one bithermal stage (stage 2) and a first stage liquid feed-forward pre-enrichment bed. Substituting a bithermal stage for the CECE mid-stage significantly reduces the lowest unit cost by 13% to 198 $·kg$^{-1}$ and increases production by 13% to 56.7 Mg·a$^{-1}$. While overall catalyst cost has increased 1.5 M$ compared to the conventional three stage CIRCE process of Case B, electrolytic cell costs have dropped by 2.6 M$. The net lower capital cost of the higher stages shifts separative work from the first stage to the higher stages, relative to Case B. The lower first stage feed-forward concentration (down 60% to 4040 ppm compared to Case B) reduces reformer losses and increases production. The overall cost savings give an investment cost of 53.1 M$ (non-reformer related capital pro-rated to an equivalent 50 Mg·a$^{-1}$ production plant size, in this case by the fraction 50.0/56.7), an 18% reduction.

Case E is a four-stage version of case D in accordance with the present invention where stages two and three are bithermal stages and the fourth stage is a CECE stage. In this case, the four stage design resulted in a 3% drop in unit cost and a 1% increase in production over the three-stage design. Adding a fourth stage results in a lower catalyst requirement and a lower first stage feed-forward concentration, reducing reformer losses by 6%. A second benefit of a four stage hybrid BHW-CIRCE design is the reduction in electrolytic cell costs. In any four stage design, the final CECE stage is approximately one-quarter the size of the final stage in a three stage design. The smaller final stage for Case E, compared to Case D, results in a 850 k$ savings in installed electrolytic cell costs.

Case F is a four stage gas-connected hybrid HWP-CIRCE design in accordance with the present invention, where stages two and three are bithermal stages and the fourth stage is a CECE stage. This gas feed-forward design produced a slightly higher (2%) unit cost than the liquid-connected design and a 2% increase in capital investment. The additional capital costs were primarily additional catalyst and empty shell costs in stages two and three. This may suggest that the gas feed-forward design does not take full advantage of the potential of the reformer gas to produce a high concentration liquid.

Summarizing the above results, it can be seen that the hybrid BHW-CIRCE design of the present invention (Case D) lowers unit cost by 13% and increases production 13% compared to an equivalent conventional CIRCE design. The four stage hybrid BHW-CIRCE design of the present invention (Case E) produces a further 3% reduction in unit cost and a 0.6% increase in production compared to the three stage process of the present invention. The gas-connected hybrid BHW-CIRCE process of the present invention (Case F) has a 2% higher unit cost than the liquid connected process but still offers a substantial improvement over the conventional CIRCE process.

It will be understood by those skilled in the art that the sizing and costing parameters used in the above described economic analysis and catalyst performance can vary. While such factors may affect the extent of improvement, under any reasonable scenario, the hybrid BHW-CIRCE processes of the present invention can be shown to effect a substantial improvement in cost over conventional CIRCE processes.

I claim:

1. In a Combined Industrially Reformed hydrogen and Catalytic Exchange ("CIRCE") heavy water production system having a series of cascaded stages, the first stage comprising a first stage catalytic exchange column for passing liquid water in deuterium exchange relation with hydrogen gas to produce a deuterium enriched first stage liquid water stream and an industrial steam reformer for evolving a hydrogen gas product stream, a portion of said deuterium enriched first stage liquid water stream from said first stage catalytic exchange column being applied as feed to said reformer and said reformer hydrogen gas product stream being applied as feed to said first stage catalytic exchange column, a Bithermal Hydrogen Water ("BHW") second stage comprising cold and hot second stage catalytic exchange columns for passing liquid water in deuterium exchange relation with hydrogen gas, said cold second stage catalytic exchange column operating at a lower temperature effective to cause transfer of deuterium from hydrogen gas to liquid water, said second stage hot catalytic exchange column operating at a higher temperature effective to cause transfer of deuterium from liquid water to hydrogen gas, means for circulating hydrogen gas in a stream through said second stage cold and hot catalytic exchange columns, means for applying a portion of said deuterium enriched first stage liquid water stream from said first stage catalytic exchange column to said second stage cold catalytic exchange column in countercurrent relation to said hydrogen gas stream to produce a deuterium enriched second stage liquid water stream, means for applying a portion of said second stage liquid water stream to said second stage hot catalytic exchange column in countercurrent relation to said hydrogen gas stream to produce a deuterium depleted second stage liquid water stream, means for applying said deuterium depleted second stage liquid water stream to said reformer, means for removing a portion of said deuterium enriched second stage liquid water stream produced by said second stage cold catalytic exchange column from said second stage, further comprising a pre-enrichment first stage cold catalytic exchange column, wherein said portion of said deuterium enriched first stage liquid water stream from said first stage catalytic exchange column is first applied to said pre-enrichment first stage cold catalytic exchange column before being applied to said second stage cold catalytic exchange column and said reformer hydrogen gas product stream is first applied to said pre-enrichment first stage cold catalytic exchange column in countercurrent relation to said deuterium enriched first stage liquid water stream before being applied to said first stage catalytic exchange column.

2. The system of claim 1 further comprising a Bithermal Hydrogen Water ("BHW") third stage comprising third stage cold and hot catalytic exchange columns for passing liquid water in deuterium exchange relation with hydrogen gas, said third stage cold catalytic exchange column operating at a lower temperature effective to cause transfer of deuterium from hydrogen gas to liquid water, said third stage hot catalytic exchange column operating at a higher temperature effective to cause transfer of deuterium from liquid water to hydrogen gas, means for circulating said hydrogen gas in a stream through said third stage cold and hot catalytic exchange columns, means for applying said removed portion of said deuterium enriched second stage liquid water stream to said third stage cold catalytic exchange column in countercurrent relation to said hydrogen gas stream to produce a deuterium enriched third stage liquid water stream, means for applying a portion of said third stage liquid water stream to said third stage hot catalytic exchange column in countercurrent relation to said hydrogen gas stream to produce a deuterium depleted third stage liquid water stream, means for applying said deuterium depleted third stage liquid water stream to said second stage hot catalytic exchange column, means for removing a portion of said deuterium enriched third stage liquid water stream from said third stage.

3. The system of claim 2 further comprising a Combined Electrolysis and Exchange ("CECE") fourth stage comprising a fourth stage catalytic exchange column for passing liquid water in deuterium exchange relation with hydrogen gas to produce a deuterium enriched fourth stage liquid water stream, electrolysis cells for evolving from said deuterium enriched fourth stage liquid water stream a deuterium enriched liquid condensate stream and an electrolytic hydrogen gas stream, means for passing said electrolytic hydrogen gas stream through said fourth stage catalytic exchange column, means for applying said removed portion of said deuterium enriched third stage liquid water stream to said fourth stage catalytic exchange column in countercurrent relation to said hydrogen gas stream to produce a deuterium enriched fourth stage liquid water stream, means for applying said deuterium enriched fourth stage liquid water stream to said electrolysis cells, means for removing a portion of said deuterium enriched liquid condensate stream from said fourth stage.

4. In a Combined Industrially Reformed hydrogen and Catalytic Exchange ("CIRCE") heavy water production system having a series of cascaded stages, the first stage comprising a first stage catalytic exchange column for passing liquid water in deuterium exchange relation with hydrogen gas to produce a deuterium enriched first stage liquid water stream and an industrial steam reformer for evolving a hydrogen gas product stream, said deuterium enriched first stage liquid water stream from said first stage catalytic exchange column being applied as feed to said reformer and a portion of said reformer hydrogen gas product stream being applied as feed to said first stage catalytic exchange column, a Bithermal Hydrogen Water ("BHW") second stage comprising cold and hot second stage catalytic exchange columns for passing liquid water in deuterium exchange relation with hydrogen gas, said cold second stage catalytic exchange column operating at a lower temperature effective to cause transfer of deuterium from hydrogen gas to liquid water, said second stage hot catalytic exchange column operating at a higher temperature effective to cause transfer of deuterium from liquid water to hydrogen gas, means for circulating said liquid water in a stream through said second stage cold and hot catalytic exchange columns, means for applying a portion of said reformer hydrogen gas product stream to said second stage hot catalytic exchange column in countercurrent relation to said liquid water stream to produce a deuterium enriched second stage hydrogen gas stream, means for applying said deuterium enriched second stage hydrogen gas stream to said second stage cold catalytic exchange column in countercurrent relation to said liquid water stream to produce a deuterium depleted second stage hydrogen gas stream and a deuterium enriched second stage liquid water stream, means for applying said deuterium depleted second stage hydrogen gas stream to said first stage catalytic exchange column, means for removing a portion of said deuterium enriched second stage liquid water stream produced by said second stage cold catalytic exchange column from said second stage, further comprising a pre-enrichment first stage hot catalytic exchange column, wherein said portion of said reformer hydrogen gas product stream is first applied to said pre-enrichment first stage hot catalytic exchange column before being applied to said second stage hot catalytic exchange column and said deuterium enriched first stage liquid water stream from said first stage catalytic exchange column is applied to said pre-enrichment first stage hot catalytic exchange column in countercurrent relation to said reformer hydrogen gas product stream before being applied as feed to said reformer.

5. The system of claim 4 further comprising a Bithermal Hydrogen Water ("BHW") third stage comprising third stage cold and hot catalytic exchange columns for passing liquid water in deuterium exchange relation with hydrogen gas, said third stage cold catalytic exchange column operating at a lower temperature effective to cause transfer of deuterium from hydrogen gas to liquid water, said third stage hot catalytic exchange column operating at a higher temperature effective to cause transfer of deuterium from liquid water to hydrogen gas, means for circulating said hydrogen gas in a stream through said third stage cold and hot catalytic exchange columns, means for applying said removed portion of said deuterium enriched second stage liquid water stream to said third stage cold catalytic exchange column in countercurrent relation to said hydrogen gas stream to produce a deuterium enriched third stage liquid water stream, means for applying a portion of said third stage liquid water stream to said third stage hot catalytic exchange column in countercurrent relation to said hydrogen gas stream to produce a deuterium depleted third stage liquid water stream, means for applying said deuterium depleted third stage liquid water stream to said second stage hot catalytic exchange column, means for removing a portion of said deuterium enriched third stage liquid water stream from said third stage.

6. The system of claim 4 further comprising a Combined Electrolysis and Exchange ("CECE") fourth stage comprising a fourth stage catalytic exchange column for passing liquid water in deuterium exchange relation with hydrogen gas to produce a deuterium enriched fourth stage liquid water stream, electrolysis cells for evolving from said deuterium enriched fourth stage liquid water stream a deuterium enriched liquid condensate stream and an electrolytic hydrogen gas stream, means for passing said electrolytic hydrogen gas stream through said fourth stage catalytic exchange column, means for applying said removed portion of said deuterium enriched third stage liquid water stream to said fourth stage catalytic exchange column in countercurrent relation to said hydrogen gas stream to produce a deuterium enriched fourth stage liquid water stream, means for applying said deuterium enriched fourth stage liquid water stream to said electrolysis cells, means for removing a portion of said deuterium enriched liquid condensate stream from said fourth stage.

* * * * *